3,124,548
NEOPRENE-EPOXY-PHENOL-ALDEHYDE
ADHESIVE CEMENT
Edmund J. Yaroch, Arden Hills, Minn., assignor to Minnesota Mining and Manufacturing Company, St. Paul, Minn., a corporation of Delaware
No Drawing. Filed May 15, 1962, Ser. No. 194,986
6 Claims. (Cl. 260—19)

This application is a continuation-in-part of my copending application Serial No. 638,753, filed February 7, 1957, now abandoned.

This invention relates to adhesive cement compositions, and is primarily concerned with spreadable liquid compositions which are resistant to gelation during storage and which upon application as coatings to smooth metal surfaces form strongly adherent films of high internal strength on mere evaporation of solvent at normal room temperatures. These adhesive cement compositions adhere equally firmly to a wide variety of other materials and have been found valuable in bonding fabric to metal, fabric to wood, metal to rubber, metal to metal, etc. The dried films are distinguished by their ability to resist softening both under exposure to elevated temperatures and on prolonged contact with liquid organic plasticizers.

The novel adhesive cements are particularly useful where it is inconvenient, expensive or impossible to heat the cement film in situ. Generally these adhesive cements, upon application as coatings on smooth metal surfaces, dry within about two minutes to provide tacky films that do not transfer to the finger when touched; yet for periods of up to two hours or more, strong adhesive bonds can normally be attained under mere contact pressure at room temperatures. Even after extended periods of time, the cement films can be reactivated to provide bonds of excellent quality. For example, dried films of these novel adhesive cements have been stored for more than three months at ordinary room temperatures and then heat activated to unite two surfaces securely.

In spite of their properties of rapid drying and strength buildup, the novel adhesive cement compositions are storable in airtight cans for extended periods without loss in homogeneity or deleterious advance in viscosity. Compositions stored for more than a year have been applied by spraying to provide uniform layers of cement which form bonds of quality equal to freshly prepared compositions.

The novel adhesive cement compositions of this invention have been found to be useful in the bonding of highly plasticized, light colored, decorative vinyl plastic films and fabrics to metal, e.g., as interior trim in automobiles. Discoloration of the vinyl sheet is avoided. A strong bond is achieved, which holds the vinyl sheet in position under all normally encountered stresses despite elevated temperatures and despite the high content of liquid plasticizer in such vinyl sheet.

Although the novel adhesive cement compositions can be formulated to dry more slowly, a special characteristic of those now being marketed is that they dry so fast that films applied by spraying are almost instantaneously dry and tacky. Hence, these novel adhesive cements can be sprayed on solvent-sensitive material such as foamed polystyrene which heretofore has presented a bonding problem because adhesive solutions known in the prior art tend to attack the foam. Now, sandwich panels are constructed by spraying a foamed polystyrene core and metal skins with the novel adhesive cement composition and then simply pressing them together. Such panels are used in building construction and withstand stresses, primarily dead load, encountered in such use, even at service temperatures as high as 185° F.

The adhesive cement composition of my invention which provides such special properties is a spreadable liquid mixture in a volatile organic liquid solvent of components comprising (1) 100 parts by weight of polymerized chloroprene (neoprene), (2) about 3–40 parts of epoxy resin having an average of more than one 1,2-epoxy group per average molecular weight, (3) a room-temperature-reactive chemical hardening agent for epoxy resin in amount sufficient to provide at room temperature a rapid cure of epoxy resin in simple admixture therewith, and (4) about 20–90 parts of an oil-soluble, heat-hardening phonol-aldehyde resinous condensation product of formaldehyde and a substituted phenol compatible with said chloroprene polymer. Preferably the novel composition also includes at least 4 parts and up to 100 parts of alkali or alkaline earth oxide or hydroxide such as the hydroxides of sodium, lithium, potassium, calcium, magnesium, strontium and barium. Magnesium oxide is especially useful, and calcium oxide, barium oxide and strontium oxide are also effective. Best results are attained at about 4–60 parts.

Based on 100 parts of neoprene, compositions containing 40 parts or more of epoxy resin and a suitable proportion of room-temperature-reactive chemical hardener normally lack long-term storability and become unsuitable for application as adhesive films within three months. While in some applications a short storage life may be tolerated, compositions of less than 20 parts epoxy resin can usually be stored for more than three months and are therefore preferred.

Because at present prices epoxy resin is substantially more expensive than neoprene, it is advantageous to hold the epoxy resin content at or near the minimum at which the desired combination of high strength, heat and plasticizer resistance, and other properties are realized. For example, about eight parts by weight of epoxy resin per 100 parts neoprene provide excellent heat and plasticizer resistance where the cement film is to be hardened at normal room temperature. Adequate performance is achieved at only four parts of the epoxy resin, but at less than about three parts, its effect is of little significance.

The adhesion to steel is significantly improved by the use of about 30–75 parts of the phenol-formaldehyde resin per 100 parts of neoprene. Lesser amounts of the phenol-formaldehyde resin also provides good adhesion to steel if the composition includes a terpene-phenolic resin, preferably a hydrocarbon terpene-phenolic resin, in an amount providing a total of 30 or more parts of these phenolic resins. Hydrocarbon terpene-phenolic resins presently commercially available are primarily made from alpha and beta pinene. Terpene-phenolic resins based on wood rosin are also commercially available.

The excellent resistance to softening at elevated temperatures of dried films of the adhesive cements of this invention is demonstrated by their ability to more than meet the rigorous Fisher heat resistance test No. 1. In this test as normally run, a thin coating of the adhesive cement is spread over a strong fabric surface and allowed to dry for one hour. A layer of the cement 0.010 inch thick is then spread over an appropriate portion of the flat face of a ⅛ inch steel plate measuring 1 x 3 inches and dried at 77° F. until a tacky film is formed which does not transfer to the finger when touched. The coated cloth is pressed firmly against a one square inch area at one end of the coated plate to form a well-bonded joint, which is allowed to air dry for 24 hours at room temperature. The assembly is then hung vertically in an oven at 91° F. with a 500-gram weight suspended from the lower end of the fabric, and the oven temperature is raised 18° F. every 15 minutes until the bond breaks or until the maximum test temperature of 325° F. is reached. Samples which attain the maximum test temperature without failure are considered acceptable as adhesive cements for the bonding of fabric, weatherstripping, and the like to metal surfaces of an automobile. Samples which fail at substantially lower temperatures have given trouble in commercial operations.

The invention will now be further described in terms of a number of specific examples. An epoxy resin having a melting point of about 10° C. as determined by the Durrans' mercury method and an epoxide equivalent weight of about 200 and prepared from epichlorhydrin and bisphenol was employed in the first example. Such a resin is available at the filing date of this application as "ERL-2774" epoxy resin. The chemical hardening agent used in this example was the reaction product of epoxy resin and excess amine and had an amine assay of 49–52 percent, a specific gravity of 1.06 to 1.09 and a viscosity of 5,000 to 13,000 centipoises. It was obtained under the trade name "ERL-2793." The phenol-aldehyde resin was an oil-soluble, heat-hardening, para-tertiary-butyl-phenol formaldehyde resin made with an alkaline catalyst with more than one mol, i.e., between 1.5 and 2.0 mols, of formaldehyde for each mol of substituted phenol, and was obtained under the trade name "CKR–1634." The phenol-aldehyde resin was fully compatible with neoprene in the proportions used. Petrobenzol, also known as textile spirits, is a petroleum naphtha from a distillation range of 140°–200° F.

EXAMPLE 1

| Composition by Weight | Adhesive Cement | | | |
| --- | --- | --- | --- | --- |
| | #1 | #2 | #3 | #4 |
| Neoprene "AC" | 100 | 100 | 100 | 100 |
| Light calcined magnesia | 4 | 4 | 4 | 4 |
| Zinc oxide | 5 | 5 | 5 | 5 |
| Epoxy resin | 8 | 8 | 8 | 8 |
| Chemical hardener | 2 | 2 | 2 | 2 |
| Phenol-aldehyde resin | 0 | 30 | 60 | 90 |
| Petrobenzol | 252 | 262 | 316 | 371 |
| Methyl ethyl ketone | 158 | 175 | 201 | 342 |
| Properties: | | | | |
| Plasticizer resistance (pounds/inch width) | 12 | 4½ | 4 | 5½ |
| Steel adhesion (pounds/inch width) | 8 | 12 | 17 | 5½ |
| Peel strength at 160° F. (pounds/inch width) | 14 | 25 | 17 | 6 |

The magnesia and zinc oxide were milled into the neoprene on a rubber mill until a continuous sheet was formed. This was sliced off and placed in a churn type mixer containing a blend of the phenol-aldehyde resin in the solvents and then mixed therewith until fully dissolved, after which the epoxy resin and hardener were stirred in.

To test its resistance to plasticizer, this composition was brushed on a clean steel panel and on the back side of a piece of jersey-backed 38 oz. "Textileather" upholstery material, a vinyl sheet product of the Textileather Division of General Tire & Rubber incorporating about 40 parts by weight of liquid plasticizer per 100 parts of vinyl chloride-based polymer. A second brush coat was applied to the vinyl sheet after the elapse of 20 minutes and a third, after 40 minutes. At 50 minutes after the application of the adhesive to the metal and the first coat to the vinyl, the two were joined with five passes of a metal roller under full arm pressure. The assembly was allowed to air dry for 7 days at room temperature and was then placed in an oven at 160° F. for 14 days to determine the resistance of the cement bond to penetration and softening by the plasticizer of the vinyl fabric. A one-inch wide strip was cut from the assembly, and after cooling to room temperature, the vinyl sheet was stripped back from the metal panel at an angle of essentially 180 degrees, using a tensile test machine operating at a jaw separation speed of two inches per minute. The stripback value thus obtained is reported above as "plasticizer resistance." Although the incorporation of phenol-aldehyde resin substantially reduces the resistance of the dried adhesive film to plasticizer attack, value of four or more pounds per inch of width in this test are considered to be satisfactory in the automotive trade for adhesion of fabrics to metal.

Improved "steel adhesion" reported above is attained in the compositions including 30 and 60 parts of the phenol-aldehyde resin, the test being similar to the plasticizer resistance test except that canvas instead of vinyl sheet is bonded to a steel panel, and the bond is not heat aged, but merely dried for one day at room temperature followed by one day at 120° F.

The same adhesive cements were tested for resistance to heat by bonding together two strips of canvas, to each of which were applied several coats of adhesive essentially in the manner of application to the vinyl sheet in the above-described plasticizer resistance test. The assemblies were dried for two days at 120° F., cut into one-inch strips, heated in an oven to 180° F., and immediately peeled apart in a tensile test machine at a jaw separation speed of 2 inches per minute. Readings were taken at 30 seconds after the start of the pull, at which time the temperature of the samples was 160° F., and are reported above as "peel strength at 160° F."

EXAMPLE 2

In Gerrard-Mattson Patent No. 2,918,442, it is shown that the incorporation of unusually high amounts of alkali or alkaline earth oxides or hydroxides in adhesive cements based on neoprene and certain phenol-aldehyde resins improves the heat resistance and certain other properties of dried films of the cements. The addition of epoxy resin and a chemical hardening agent therefor to solutions of neoprene and the above-described phenol-aldehyde resin "CKR–1634" with large amounts of alkaline earth oxide was found to gel the solutions. It was unexpectedly found that gelation could be averted by allowing the mixture of neoprene, oxide and phenol-aldehyde resin to stand at room temperature for a period of ten days to two weeks before the epoxy resin and hardener were added.

Surprisingly when the "CKR–1634" is replaced by "Super-Beckacite 1003," a product of Reichhold Chemicals Inc., the epoxy resin and its chemical hardener can be added immediately without causing gelation. This phenol-aldehyde resin is an oil-soluble heat-heardening phenolic resin compatible with neoprene and produced by reaction, in the presence of an alkaline catalyst, of formaldehyde with less than an equal mol proportion of a para-tertiary-butyl phenol.

The following adhesive cement composition was prepared by dissolving the phenol-aldehyde resin in the solvents, mixing in the milled rubber, and then adding the epoxy resin and hardener without any delay in the addition of components. The epoxy resin and its hardener are those described in Example 1.

*Adhesive Cement #5*

| Components: | Parts by weight |
| --- | --- |
| Neoprene "AC" | 100 |
| Light calcined magnesia | 40 |
| Zinc oxide | 5 |
| Sodium acetate | 1 |
| Epoxy resin | 8 |
| Chemical hardening agent | 2 |
| "Super-Beckacite 1003" | 62.4 |
| Toluol | 21 |
| Methyl ethyl ketone | 111 |
| Acetone | 130 |
| Petrobenzol | 204 |
| Hexane ("Skelly B") | 174 |

This composition had a viscosity of 9 seconds as measured at 80° F. using a Ford cup with ¼" orifice, indicating eminent suitability for spraying operations. The viscosity advanced to 15 seconds in 21 days. After 6 months' storage at room temperature, the composition was still readily sprayable.

A number of test laminates of steel and "Textileather" vinyl sheet were prepared and subjected to the above-described plasticizer resistance test. Some were held for up to seven days at room temperature while others, after first drying for a day at room temperature, were placed in an oven heated to 160° F. for periods ranging up to three months. Samples were withdrawn as noted below and tested for resistance to stripback in the manner described above. The following results were obtained in comparing an adhesive cement composition of this example (using 62 parts of "CKR-1634" as the phenol-aldehyde resin—referred to hereinafter as "adhesive cement #6") to an adhesive cement of identical composition save for the omission of the epoxy resin and hardener.

|  | Prior Art Cement (no epoxy or hardener), pounds/inch | Adhesive Cement #6 (contains epoxy resin and hardener), pounds/inch |
| --- | --- | --- |
| 3 days at R. T. | 12 | 23 |
| 7 days at R. T. | 23 | 19½ |
| 7 days at 160° F. | 2 | 17 |
| 10 days at 160° F. | 1 | 13 |
| 14 days at 160° F. | 1 | 13 |
| 19 days at 160° F. | 1 | 11 |
| 36 days at 160° F. | 1 | 12 |
| 3 months at 160° F. | 1 | 11½ |

Not only does this test illustrate the long-term resistance to plasticizer attack of the adhesives of this invention, but it illustrates the ability of the adhesives to develop strong bonds rapidly. Surprisingly, this improvement is not accompanied by any noticeable shortening in the time after coating during which strong bonds can be formed, as illustrated by a test known as the Fisher tensile test No. 1. In this test, films of the adhesive composition are applied to several steel panels using a doctor blade adjusted to give a wet film of 0.010 inch in thickness, and at the same time a scrape coat of the adhesive is applied to pieces of rubber-latex-backed automotive trim fabric. At each of a number of specified times of elapse after coating, the coated surfaces of a steel panel and a piece of the trim fabric are joined by three passes of a two-inch wide rubber roller under a force of 15 pounds to provide a bonded area of one inch square. The laminate thus formed is immediately placed in a tensile test machine, set to operate at a jaw separation of 20 inches per minute, and the shear force necessary to break the bond is recorded. The following data was obtained for adhesive cement #5 in comparison to an otherwise identical prior art adhesive cement in which the epoxy resin and hardener were omitted.

| Minutes of Open Time | Prior Art Cement (no epoxy or hardener), pounds/sq. in. | Adhesive Cement #5 (contains epoxy resin and hardener), pounds/sq. in. |
| --- | --- | --- |
| 1 | 10 | 15 |
| 3 | 35 | 50 |
| 25 | 55 | 49 |
| 120 | 35 | 30 |

In this test, values in excess of about 30–40 pounds per square inch are considered satisfactory for automotive use. Since such prior art cements have already enjoyed considerable commercial success in the automobile industry for joining conventional fabrics, rubbers, etc., to steel, it is obvious that adhesive cements of this invention are well suited for adhering plasticized vinyl sheeting to automobile bodies as well as to general use in both the automobile industry and elsewhere.

Adhesive cement #6 of this example and the control prior art cement having no epoxy resin or hardener were used to bond wood to wood. In tests for shear resistance after 10 days at room temperature, adhesive cement #6 yielded at 550 pounds per square inch, more than double the shear strength of the control. A sample bonded by adhesive cement #6 held for three days at room temperature followed by three days at 160° F. withstood more than 950 pounds per square inch, at which force the wood failed. The prior art cement bond broke at 325 pounds per square inch.

Adhesive cement #6 was used to bond plywood to aluminum. A one inch square bond was subjected to a twenty pound dead load in shear, and the temperature was raised from room temperature to 450° F. at the rate of 1° F. per second. The joint had not failed at 450° F. A control laminate bonded by the prior art cement containing no epoxy resin or hardener failed at 255° F.

Adhesive cement #6 was sprayed on each of two aluminum panels and allowed to dry for three days at 120° F. The coated surfaces were then joined under a pressure of 150 pounds per square inch at 250° F. for one minute. The laminate was then placed in an oven at 160° F., and a twenty-five pound dead weight was hung from one panel to effect a shear force. Ten pound weights were added every ten minutes. The laminate failed at 210 pounds whereas a control laminate bonded by the prior art cement failed at 125 pounds.

EXAMPLE 3

Compositions of this invention employing large amounts of alkali or alkaline earth oxides or hydroxides in conjunction with phenol-aldehyde resin are preferred as compared to compositions including lesser amounts where a more rapid release of solvent from films and a more rapid buildup in strength of bond is desired. The addition of at least a trace of water to such modified compositions normally further speeds the release of solvent and buildup of strength. In spite of the increased reactivity thus attained, no decrease is apparent in the time for which the cement may be stored. The following adhesive cement composition has demonstrated rapid release of solvent from coatings and rapid buildup of strength as well as excellent resistance to softening effects in the above-described plasticizer resistance test, i.e. 17 pounds per inch of width after being aged 20 days at 160° F.

*Adhesive Cement #7*

| Components: | Parts by weight |
| --- | --- |
| Neoprene "WHV" | 100 |
| Light calcined magnesia | 40 |
| Zinc oxide | 5 |
| Sodium acetate | 1 |
| Toluol | 19 |
| Methyl ethyl ketone | 104 |
| Petrobenzol | 210 |
| Acetone | 156 |
| Hexane ("Skelly B") | 200 |
| Water | 8 |
| "CKR-1634" resin | 62 |
| Epoxy resin of Example 1 | 4.8 |
| Chemical hardener of Example 1 | 1.2 |

A number of adhesive cement compositions were made up with the foregoing components except that the last three components were varied in proportion and some of the compositions included terpene-phenolic resin of the alpha-pinene type, specifically "Schenectady SP-553," as noted below.

| Component Variation | Adehsive Cement | | | | |
|---|---|---|---|---|---|
| | #7 | #8 | #9 | #10 | #11 |
| Phenol-aldehyde resin | 62 | 31 | 21 | 20 | 20 |
| Terpene phenolic resin | | 31 | 41 | | 10 |
| Epoxy resin | 4.8 | 4.8 | 4.8 | 4.8 | 16 |
| Chemical hardener | 1.2 | 1.2 | 1.2 | 1.2 | 4 |
| Properties: | | | | | |
| Steel adhesion at R. T. (pounds/-inch width) | 23 | 21 | 14 | 5 | 6 |
| Steel adhesion at 160° F. (pounds/-inch width) | 19 | 6 | 3 | 5.5 | 10.5 |
| Peel strength at 160° F. (pounds/-inch width) | 12.5 | 15 | 13.5 | 11 | 10 |

The "steel adhesion at R.T." test is essentially that described in Example 1 except that here the bonds were formed and held for 14 days before being tested at room temperature.

"Steel adhesion at 160° F." is essentially the same test except that the bonds were formed and dried for one day at room temperature followed by two days at 120° F. and then heated to 160° F. and tested for peel strength at the temperature.

"Peel strength at 160° F." is essentially that test of Example 1 except that the bonded canvas strips were dried for one day at room temperature followed by two days at 120° F. and then heated to 160° F. and tested at that temperature.

A variety of epoxy resins have shown utility in the practice of this invention. These include bisphenolic resins of the type described in Example 1 but having different molecular weights, epoxy equivalencies, etc., e.g., Epon 834 having a melting point of 20°–28° C. as determined by the Durrans' mercury method and an epoxide equivalent weight of about 225–290 and prepared from epichlorhydrin and bisphenol; Epon No. 562, a liquid resin believed to be prepared from epichlorhydrin and glycerol at a mol ratio of about 3 to 1; and resorcinol-type epoxy resin such as one prepared from epichlorhydrin and resorcinol at a mol ratio of about 5 to 1 having an epoxide equivalent weight of about 150. Epichlorhydrinnovolak epoxy resin such as "Borden 823" has also demonstrated utility. Such polyglycidyl ether epoxy resins are especially preferred.

Some chemical hardening agents for epoxy resin co-react with the resin and ordinarily are used in amounts approximately stoichiometrically equivalent thereto, but have been used with success in amounts varying from less than one-half to more than double the theoretical equivalency to free epoxy groups of the resin. Other chemical hardening agents catalyze the hardening of the epoxy resin and may be present in minute proportions. Certain of the chemical hardening agents produce curing of epoxy resin only when heated therewith to elevated temperatures whereas others, notably compatible amines, initiate rapid curing of the resin at ordinary room temperature and so are particularly useful in the practice of this invention. Among those which have proved to be of value in forming strong adhesive bonds at room temperature having good resistance to ester plasticizers and heat, etc., are diethylene triamine, dimethylaminopropyl amine, pyrrolidine, tris(2,4,6-dimethylaminomethyl)phenol, dibutyl amine, and "Versamid 115," a polymeric amine product of General Mills, Inc., which states that it is the addition product of polymerized long chain fatty acids and polyfunctional primary and secondary amines and that it has a molecular weight of 1500–2000 and that 244–255 grams thereof would neutralize an equivalent of acid.

When heat may be applied in forming adhesive bonds, compositions having higher proportions of epoxy resin give still higher internal strength and resistance to heat. For such uses, epoxy resin-hardener combinations which react slowly at room temperatures but which react readily at elevated temperatures, e.g., certain carboxylic acid anhydrides, would enhance the storage life of the adhesive cement compositions.

Since mixtures of epoxy resin and room-temperature-reactive chemical hardening agents in 50 percent solution in methyl ethyl ketone usually solidify within 72 hours at room temperature, it is surprising that compositions of this invention employing room-temperature-reactive hardening agents can normally be stored for periods of more than a year without losing their ability to be brushed or sprayed to form cement films capable of developing quickly strong bonds at ordinary room temperatures.

Under certain conditions, the compositions of this invention have been found to exude an undesirable odor, which can be eliminated through the use of sulfur-free neoprenes, which have been found to be equally effective in providing heat and plasticizer resistant films and obviously are more desirable for uses such as in automobile interiors.

Efforts have been made to substitute other synthetic and natural rubbers for neoprene in providing stable spreadable adhesive cement compositions which on drying form strong adherent heat-resistant films of high resistance to softening by plasticizers, but without complete success. For example, substitution of nitrile rubbers for the neoprene of these cements results in extremely short bonding range. Other rubbery polymers are deficient in one or more respects. Polychloroprene, or neoprene, on the other hand, provides a combination of properties which has been found highly useful in cement compositions as here described.

In place of the solvents employed in the illustrative examples above, I may employ various aromatic or naphthenic constituents, as well as other suitable volatile solvents and diluents, to give the cement a suitable consistency.

Small amounts of other resins may be added to the novel adhesive cement compositions without detracting from their storability or their ability on drying to form strong adherent heat and plasticizer resistant films. Such modifying resins as cumarone-indene resins, wood rosins and modified wood rosins can help to adjust the properties of a composition to the requirements of a particular application.

Where desired, various pigments, inert fillers, (granular or fibrous) or coloring materials may be added to any of my cement compositions. Fibrous material such as asbestos fibers are advantageous in some uses, e.g., to reduce the flow of the wet cement when applied in thick layers, as in covering metal to metal joints, and such like.

I claim:

1. A liquid adhesive cement composition which is resistant to gelation during storage and upon application as coatings on smooth metal surfaces dries in minutes to provide tacky films that do not transfer to the finger when touched and for periods of up to about two hours form strong adhesive bonds under mere contact pressure at room temperatures, which bonds rapidly develop excellent resistance to shear and dead loads at elevated temperature, said cement composition being a spreadable liquid mixture in a volatile organic liquid solvent of components comprising (1) 100 parts by weight of polymerized chloroprene, (2) 3–40 parts of epoxy resin having an average of more than one 1,2-epoxy group per average molecular weight, (3) a room-temperature-reactive chemical hardening agent for epoxy resin in amount sufficient to provide at room temperature a rapid cure of epoxy resin in simple admixture therewith, and (4) 20 to 90 parts of a heat-hardening phenol-aldehyde resinous condensation product of formaldehyde and a substituted phenol compatible with said chloroprene polymer.

2. A liquid adhesive cement composition as defined in claim 1 and also including 4–100 parts of a member of the group selected from alkali and alkaline earth oxides and hydroxides.

3. A liquid adhesive cement composition as defined in claim 1 and also including about 4–60 parts of magnesia.

4. A liquid adhesive cement composition which is resistant to gelation during storage and upon application as coatings on smooth metal surfaces dries in minutes to provide tacky films that do not transfer to the finger when touched and for periods of up to about two hours form strong adhesive bonds under mere contact pressure at room temperatures, which bonds rapidly develop excellent resistance to shear and dead loads at elevated temperature, said cement composition being a spreadable liquid mixture in a volatile organic liquid solvent of components consisting essentially of (1) 100 parts by weight of polymerized chloroprene, (2) 4–20 parts of polyglycidyl ether epoxy resin, (3) polyamine chemical hardening agent for epoxy resin in amount sufficient to provide at room temperature a rapid cure of epoxy resin in simple admixture therewith, (4) 30–90 parts of a heat-hardening phenol-aldehyde resinous condensation product of formaldehyde and a substituted phenol compatible with said chloroprene polymer, and (5) about 4–60 parts of magnesia.

5. A liquid adhesive cement composition which is resistant to gelation during storage and upon application as coatings on smooth metal surfaces dries in minutes to provide tacky films that do not transfer to the finger when touched and for periods of up to about two hours form strong adhesive bonds under mere contact pressure at room temperatures, which bonds rapidly develop excellent resistance to shear and dead loads at elevated temperature, said cement composition being a spreadable liquid mixture in a volatile organic liquid solvent of components consisting essentially of (1) 100 parts by weight of polymerized chloroprene, (2) 4–9 parts of polyglycidyl ether epoxy resin, (3) polyamine chemical hardening agent for epoxy resin reactive therewith at room temperature and in amount sufficient to provide at room temperature a rapid cure of epoxy resin in simple admixture therewith, (4) 30–75 parts of a heat-hardening phenol-aldehyde resinous condensation product of formaldehyde and a substituted phenol compatible with said chloroprene polymer, and (5) about 4–60 parts of magnesia.

6. A liquid adhesive cement composition which is resistant to gelation during storage and upon application as coatings on smooth metal surfaces dries in minutes to provide tacky films that do not transfer to the finger when touched and for periods of up to about two hours form strong adhesive bonds under mere contact pressure at room temperatures, which bonds rapidly develop excellent resistance to shear and dead loads at elevated temperature, said cement composition being a spreadable liquid mixture in a volatile organic liquid solvent of components comprising (1) 100 parts by weight of polymerized chloroprene, (2) 3–40 parts of epoxy resin having an average of more than one 1,2-epoxy group per average molecular weight, (3) polyamine chemical hardening agent for epoxy resin, reactive therewith at room temperature and in amount sufficient to provide at room temperature a rapid cure of epoxy resin in simple admixture therewith, and (4) 30–90 parts of a heat-hardening phenol-aldehyde resinous condensation product of formaldehyde and a substituted phenol compatible with said chloroprene polymer.

References Cited in the file of this patent

UNITED STATES PATENTS

| | | |
|---|---|---|
| 2,376,854 | Saunders et al. | May 22, 1945 |
| 2,879,252 | Been et al. | Mar. 24, 1959 |
| 2,886,473 | Schroeder | May 12, 1959 |

OTHER REFERENCES

"Metal Bonding Adhesives," by J. M. Black et al. in Modern Plastics for December 1954, pages 139, 140, 142, 147 and 237.